(12) United States Patent
Sokeila et al.

(10) Patent No.: US 12,309,508 B2
(45) Date of Patent: May 20, 2025

(54) IMAGE FRAME SELECTION FOR MULTI-FRAME FUSION

(71) Applicant: Microsoft Technology Licensing, LLC, Redmond, WA (US)

(72) Inventors: Tomi Marko Juhani Sokeila, Pirkanmaa (FI); Ari Väinö Johannes Partinen, Pirkanmaa (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/517,591

(22) Filed: Nov. 22, 2023

(65) Prior Publication Data

US 2024/0089614 A1     Mar. 14, 2024

Related U.S. Application Data

(63) Continuation of application No. 17/828,575, filed on May 31, 2022, now Pat. No. 11,863,880.

(51) Int. Cl.
    *H04N 23/951*     (2023.01)
    *G06T 5/50*     (2006.01)
    (Continued)

(52) U.S. Cl.
    CPC .............. *H04N 23/951* (2023.01); *G06T 5/50* (2013.01); *G06T 5/92* (2024.01); *H04N 23/632* (2023.01); *G06T 2207/20221* (2013.01)

(58) Field of Classification Search
    CPC .. H04N 23/951; H04N 23/632; H04N 23/667; H04N 23/741; H04N 23/81;
    (Continued)

(56) References Cited

U.S. PATENT DOCUMENTS

| 2009/0208097 A1* | 8/2009 | Husseini | G06T 7/32 |
| | | | 382/162 |
| 2016/0148376 A1* | 5/2016 | Ryu | A61B 8/00 |
| | | | 382/131 |

(Continued)

OTHER PUBLICATIONS

Ernst, et al., "HDR+ with Bracketing on Pixel Phones", Retrieved from internet URL: https://research.google/blog/hdr-with-bracketing-on-pixel-phones/?m=1, Apr. 23, 2021, 9 pages.

(Continued)

*Primary Examiner* — Hung H Lam
(74) *Attorney, Agent, or Firm* — Weaver IP L.L.C.

(57) ABSTRACT

Methods, systems, apparatuses, and computer-readable storage mediums described herein are configured to fuse image frames captured by a camera to generate an image frame having high dynamic range and reduced amount of noise. For instance, after a shutter button of the camera is activated, one or more history image frames captured during a preview mode of the camera (e.g., before the shutter button is activated) are compared to a highlight recovery frame captured after the shutter button is activated to determine a level of similarity therebetween. The history image frame(s) may be captured with a first exposure value, and the highlight recovery frame may be captured with a second exposure value that is different than the first exposure value. History image frame(s) that are determined to be relatively similar to the highlight recovery frame are combined with the highlight recovery frame to generate the image frame having high dynamic range.

20 Claims, 9 Drawing Sheets

(51) Int. Cl.
*G06T 5/92* (2024.01)
*H04N 23/63* (2023.01)

(58) Field of Classification Search
CPC .. H04N 23/60; G06T 5/50; G06T 5/92; G06T 2207/20221
See application file for complete search history.

(56) References Cited

U.S. PATENT DOCUMENTS

2018/0084181 A1* 3/2018 Sachs ................... H04N 23/73
2022/0121841 A1* 4/2022 Oh ........................ G06T 7/73
2023/0336878 A1* 10/2023 Chen ................... H04N 23/741

OTHER PUBLICATIONS

Wronski, et al., "See Better and Further with Super Res Zoom on the Pixel 3", ACM Transactions on Graphics, Retrieved from internet URL: https://research.google/blog/see-better-and-further-with-super-res-zoom-on-the-pixel-3/, Aug. 6, 2020, 14 pages.

* cited by examiner

IMAGE FRAME SELECTION FOR MULTI-FRAME FUSION

CROSS-REFERENCE TO RELATED APPLICATIONS

This application is a continuation of U.S. patent application Ser. No. 17/828,575, filed May 31, 2022, entitled "IMAGE FRAME SELECTION FOR MULTI-FRAME FUSION," the entirety of which is incorporated by reference herein.

BACKGROUND

Portable electronic devices, such as mobile phones, tablet computers, multimedia devices, etc., often include multimedia capabilities that enable a user to capture images (e.g., digital photos), record video, and/or communicate using communication features of the device. To implement these multimedia capabilities, the portable devices are implemented with a camera device that can be used to capture the images, which are then processed and saved as digital photos.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to fuse image frames captured by a camera to generate an image frame having high dynamic range and reduced amount to noise. For instance, after a shutter button of the camera is activated, one or more history image frames captured during a preview mode of the camera (e.g., before the shutter button is activated) are compared to a highlight recovery frame captured after the shutter button is activated to determine a level of similarity therebetween. The history image frame(s) may be captured with a first exposure value, and the highlight recovery frame may be captured with a second exposure value that is different than the first exposure value. History image frame(s) that are determined to be relatively similar to the highlight recovery frame are combined with the highlight recovery frame to generate the image frame having high dynamic range.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
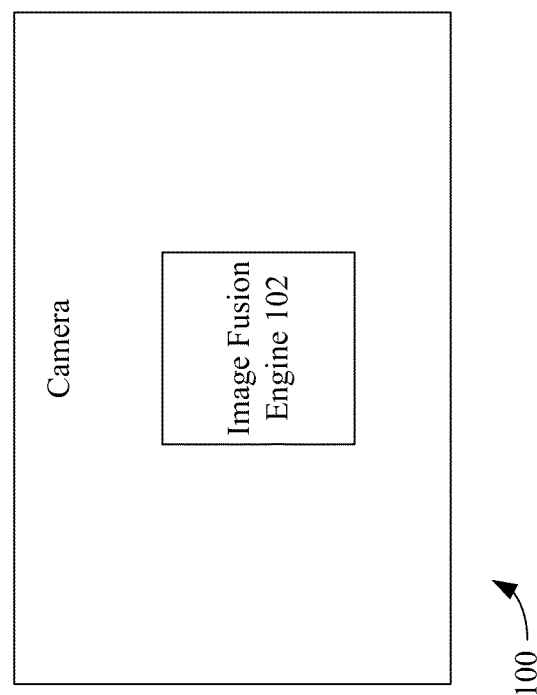
FIG. 1 shows a block diagram of an example camera that contains an image fusion engine in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein are directed to fusing image frames captured by a camera to generate an image frame having high dynamic range and reduced amount of noise. For instance, after a shutter button of the camera is activated, one or more history image frames captured during a preview mode of the camera (e.g., before the shutter button is activated) are compared to a highlight recovery frame captured after the shutter button is activated to determine a level of similarity therebetween. The history image frame(s) may be captured with a first exposure value, and the highlight recovery frame may be captured with a second exposure value that is different than the first exposure value. History image frame(s) that are determined to be relatively similar to the highlight recovery frame are combined with the highlight recovery frame to generate the image frame having high dynamic range.

The embodiments described herein are directed to improvements to a technological field; in particular, digital imaging. Conventional techniques simply merge a predetermined reference frame that is selected based on a fixed or predetermined time difference between when the highlight recovery frame is captured and when the reference image frame is captured during the preview mode. A problem arises when there is significant movement in the scene such that the content of the selected reference frame and the content of the highlight recovery frame differs significantly. Such a scenario makes fusion between such image frames impracticable, as the resulting final image frame would comprise a blurred or corrupted view of the scene being captured. By utilizing image frame(s) of the history image frame(s) that are relatively similar to the highlight recovery frame, the resulting final image frame does not contain such issues.

Techniques described herein also generate the final image frame with minimal shutter lag. For instance, in accordance with an embodiment, history image frames may be continuously compared to each other as they are captured during the preview mode. History image frames that are determined to not be relatively similar with the latest history image frame captured are discarded. After activation of the shutter button, the highlight recovery frame need only be compared to the latest history image frame captured to determine a similarity therebetween, rather than comparing each of history image frames to the highlight recovery frame. Such a technique advantageously reduces the processing cycles required to determine whether a history image frame has a level of similarity with respect to the highlight recovery frame. Not only does this improve the functioning of the computing device or camera device on which such techniques are implemented, but the amount of time required to generate the final image frame is reduced, thereby reducing the processing (or capture) latency between the shutter button being activated and the final image frame being made available to the user.

For example, FIG. 1 shows a block diagram of an example camera 100 in accordance with an example embodiment. In accordance with an embodiment camera 100 may be incorporated within a computing device, such as any type of a mobile computing device, including, but not limited to, a Microsoft® Surface® device, a personal digital assistant (PDA), a laptop computer, a notebook computer, a tablet computer such as an Apple iPad™, a smart phone (such as an Apple® iPhone®), a phone implementing the Google® Android™ operating system), a wearable computing device (e.g., a head-mounted device including smart glasses such as Google® Glass™, a virtual headset such as Oculus Rift® by Oculus VR, LLC or HoloLens® by Microsoft Corporation), or a stationary computing device such as a desktop computer or PC (personal computer). In accordance with another embodiment, camera 100 is a dedicated camera device, such as, but not limited to a single lens reflex (SLR) camera, a point and shoot camera, etc.

As shown in FIG. 1, camera 100 comprises an image fusion engine 102. Image fusion engine 102 is configured to fuse together (e.g., combine) multiple image frames captured by camera 100 to provide a final image frame that comprises a high (or wider) dynamic range. Capturing multiple frames for a single capture increases the capture time. Therefore, image fusion engine 102 utilizes one or more image frames that are captured during a preview mode of the camera (referred herein as history image frames) to fuse with an image frame captured responsive to the shutter button being activated (referred herein as a highlight recovery frame). During the preview mode, image frames are captured and/or displayed via a display screen of camera 100 before a user of camera 100 activates a shutter button (also referred to as a shutter-release button). To emulate zero shutter lag (e.g., the delay between triggering the shutter button and when the image frame is actually recorded), the image frame that is selected for fusion (also referred to as a reference image frame) is selected from the history image frames. Typically, the reference frame that is selected based on a fixed or predetermined time difference between when the highlight recovery frame is captured and when the reference image frame is captured during the preview mode. In a scenario in which the scene being captured has a wider dynamic range, the highlight recovery frame may comprise one or more over or under exposures image frames. A problem arises when there is significant movement in the scene such that the content of the selected reference frame and the content of the highlight recovery frame(s) differs significantly. Such a scenario makes fusion between such image frames impracticable, as the resulting final image would comprise a blurred or corrupted view of the scene being captured.

In accordance with embodiments described herein, rather than using a static time difference between the capture trigger moment and the reference frame, image fusion engine 102 is configured to dynamically determine one or more image frames from the history image frames for fusion with the highlight recovery frame. For instance, image fusion engine 102 may determine which frame(s) of the history image frames should be utilized for fusion based on a level of similarity between each of the history image frames and the highlight recovery frame. Frame(s) of history image frames that are determined to be relatively similar to the highlight recovery frame are determined to be frames that do not capture motion in the scene being recorded (i.e., there was relatively little to no motion in the scene being captured). Frame(s) of history image frames that are determined to be relatively dissimilar to the highlight recovery frame are determined to be frames that capture motion in the scene being recorded (i.e., there was a significant motion in the scene being captured). In the event that there is no significant motion in the scene (thus, the reference frame and the post-trigger highlight recovery frame are relatively similar), then the default zero shutter lag delay will hold. In the event that there is significant motion in the scene (the reference frame and the post-trigger highlight recovery frame are relatively dissimilar), the reference frame is effectively moved closer to the post-trigger highlight recovery frame. That is, frame(s) of the history image frames that are determined to be relatively similar to the post-trigger highlight recovery frame are utilized for fusion therewith. Additional details regarding image fusion engine 102 are described below with reference to FIG. 2.

Figure 2:
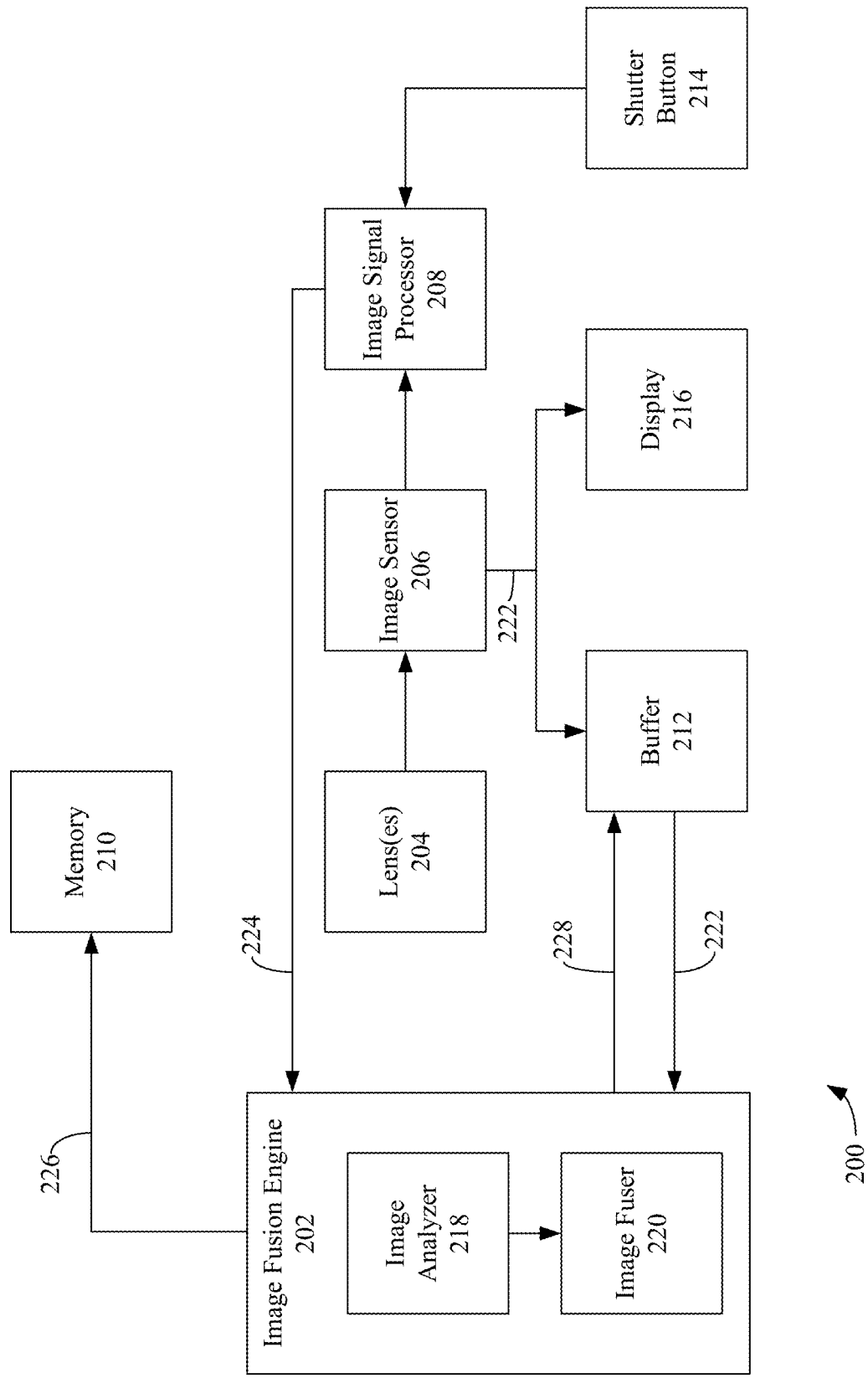
FIG. 2 shows a block diagram of a system configured to fuse image frames based on a level of similarity therebetween in accordance with an example embodiment.

FIG. 2 shows a block diagram of a system 200 configured to fuse image frames based on a level of similarity therebetween in accordance with an example embodiment. System 200 may be incorporated in a camera, such as camera 100, as shown in FIG. 1 or a computing device in which a camera is incorporated. As shown in FIG. 2, system 200 comprises an image fusion engine 202, one or more lenses 204, an image sensor 206, an image signal processor 208, a memory 210, a buffer 212, a shutter button 214, and a display 216.

Lens(es) 204 are configured to receive light from a light source, e.g., via an opening of a lens barrel. Image sensor 206 is configured to detect light transmitted through lens(es) 204 and convert the detected light into an electrical signal that represents an image. The electrical signal is transmitted to image signal processor 208. Using various algorithms, image signal processor 208 processes the image received from image sensor 206. The term "processes images" or "processing the image" is defined as one or more actions that are employed to modify or alter data contained in an image.

During a preview mode of the camera (e.g., when the camera is powered on and before shutter button 214 is activated) images captured by image sensor 206 may be stored in buffer 212 as image frames and displayed via display 216, which acts as a viewfinder. In accordance with an embodiment, buffer 212 is a queue-like data structure, such as ring buffer (also referred to as a circular buffer). It is noted that the image frames captured during the preview mode may be processed by image signal processor 208 before being displayed via display 216. A ring buffer is a data structure comprising an N number of elements, where N is any positive integer. Each element of the ring buffer is configured to store an image frame. When a new image frame is to be stored in the ring buffer when the ring buffer is full (e.g., all the elements are populated with a respective image frame), the oldest image frame stored in the ring buffer is removed and the new image frame is added to the ring buffer. In an embodiment in which the camera is configured to capture 30 frames per second, buffer 212 is configured to store up to 30 frames at any given second. Each image frame stored in buffer 212 may be associated with a time stamp that indicates a time and/or date at which the image frame was stored in buffer 212. Accordingly, the image frames stored in buffer 212 may represent a time sequence of image frames that are captured by image sensor 206. Such frames are also referred herein as historical image frames. Utilizing a ring buffer provides several advantages. For example, the ring buffer may utilize a fixed-size array that can be pre-allocated and allows for efficient memory access, as the read operations to the ring buffer are constant time O(1).

During the preview mode, image sensor 206 may be configured to utilize a particular exposure value when capturing images. For example, the exposure value may be set to a default exposure value, such as zero. The exposure value may be a function of a shutter speed setting and f-number setting of the camera.

Display 216 may be a liquid crystal display (LCD), light-emitting diode (LED) display, an active-matrix organic LED (AMOLED) display, or the like. During a preview mode of the camera, display 216 displays a digital representation of the scene captured by image sensor 206 and a preview of what image sensor 206 detects before shutter button 214 is activated. Such a feature is referred to as "live preview."

Shutter button 214 may comprise a user interface element that, when activated, causes the image captured by image sensor 206 to be processed by image signal processor 208 and subsequently stored in memory 210. In accordance with an embodiment in which the camera is incorporated in a mobile computing device, such as a smart phone, shutter button 214 may comprise a graphical user interface element (e.g., a button) that is activated upon receiving touch-based input. In accordance with an embodiment in which the camera is a dedicated camera device, shutter button 214 may comprise a physical button that is activated when pressed on, for example, by a user's finger.

Image signal processor 208 is configured process the captured image in accordance with any suitable image processing algorithm. For example, image signal processor 208 can process raw data that represents the captured images into a suitable file format, like Y'UV, YUV, YCbCr, YPbPr or any other file format. As another example, image signal processor 208 may perform automatic exposure control (AEC), automatic gain control (AGC) or automatic white balance (AWB) and may resize images as needed. When performing automatic exposure control, image signal processor 208 may determine an exposure value based on an amount of light measured by image sensor 206. For instance, if the amount of light measured by image sensor 206 is relatively high, image signal processor 208 may set the exposure value so that the captured image is under exposed. If the amount of light measured by images sensor 206 is relatively low, image signal processor 208 may set the exposure value so that the captured image is over exposed.

As an option, image signal processor 208 may be configured to compress the images into a suitable format by employing any available compression standard, such as JPEG or MPEG and their associated variants. As will be described below, it is not necessary that image signal processor 208 perform all these techniques, as some of them may not be necessary or may even be executed by other components, such as a central processing unit (CPU) (not shown) or image fusion engine 202.

Image fusion engine 202 is configured to perform multi-frame fusion, where multiple image frames are fused together to generate an image frame having enhanced image quality (e.g., having high (or wider) dynamic range). In particular, image fusion engine 202 is configured to fuse (or combine) one or more image frames stored in buffer 212 (e.g., the history image frame(s) stored therein) with an image frame captured responsive to activation of shutter button 214 (e.g., a highlight recovery frame).

Image fusion engine 202 comprises an image analyzer 218 and an image fuser 220. Image analyzer 218 is configured to analyze one or more history image frames from buffer 212 (shown as history image frame(s) 222) and a highlight recovery frame (shown as a highlight recovery frame 224) generated by image signal processor 208 and determine whether an image frame of history image frame(s) 222 has a particular level of similarity with highlight recovery frame 222. For instance, image analyzer 218 may determine whether the level of similarity between history image frame(s) 222 and highlight recovery frame 224 meets a threshold condition. In accordance with an embodiment, the threshold condition is whether history image frame(s) 222 and highlight recovery frame 224 have a certain percentage of similarity (e.g., the content depicted therein has a 95% similarity).

Image fuser 220 is configured to combine an image frame of history image frame(s) 222 determined to have a level of similarity with highlight recovery frame 224 that meets the threshold condition with highlight recovery frame 224. To combine image frames (e.g., a first image frame and a second image frame), image fuser 220 may utilize various exposure-blending techniques known those having ordinary skill in the relevant art(s). For instance, image fuser 220 may utilize a Debevic-based algorithm, a Robertson-based algorithm, a Mertenes-based algorithm, etc. In certain scenarios, more than one of history image frame(s) may have a level of similarity with highlight recovery frame 224 that meets the threshold condition. In accordance with such an embodiment, image fuser 220 may be configured to combine such history image frames together to generate a noise-reduced history image frame. Image fuser 220 then combines the noise-reduced history image frame with highlight recovery frame 224 to generate a final image frame 226. Image fuser 220 may utilize various noise-reduction techniques known those having ordinary skill in the relevant art(s), including, but not limited to, an image averaging technique, where corresponding pixel values of the history image frames are averaged together to generate average pixel values, and the pixels of the noise-reduced history image is comprised of such average pixel values.

In accordance with an embodiment, image analyzer 218 utilizes a motion estimation-based technique to determine how similar a particular history image frame of history image frame(s) 222 is to highlight recovery frame 224. The underlying supposition behind motion estimation is that the patterns corresponding to objects and background in a sequence of image frames moves within the frame to form corresponding objects in a subsequent image frame. In accordance with such a technique, when comparing a first image frame (e.g., a particular image frame of history image frame(s) 222) with a second image frame (e.g., highlight recovery frame 224), image analyzer 218 may segment (e.g., divide) each of the first and second image frames into macroblocks. Each macroblock of a particular image frame may comprise a block of N by N pixels, where N comprises a positive value (e.g., 8×8 pixels, 16×16 pixels, etc.). Each macroblock from the first image frame is compared to a corresponding macroblock from the second image frame (e.g., a macroblock comprising the same object depicted in the macroblock of the first image frame). Image analyzer 218 then creates a motion vector that models the movement of a macroblock from one location of the first image frame to another location within the second image frame. This movement, calculated for all the macroblocks of a given image frame, constitutes the motion estimated in an image frame. The greater the match between corresponding macroblocks, the greater the level of similarity.

Image analyzer 218 may utilize a search parameter, p, which defines the search area for an acceptable macroblock match. The search parameter may represent the number of pixels on all four sides of the corresponding macroblock in the first image frame. The search parameter is a measure of motion. The larger the value of the search parameter p, the larger the potential motion and the possibility of finding a good match.

Image analyzer 218 may use various macroblock matching techniques, including, but not limited to, an exhaustive search-based algorithm, an optimized hierarchical block matching-based algorithm, a three-step search-based algorithm, a two-dimensional logarithmic search-based algorithm, a diamond search-based algorithm, an adaptive rood pattern search-based algorithm, and/or any other macroblock matching technique known to those having ordinary skill in the relevant art(s).

Image fusion engine 202 stores final image frame 226 in memory 210. Final image frame 226 may be accessed via one or more applications (e.g., photo editing applications, photo gallery applications, etc.) and/or displayed via display 216. Examples of memory 210 include, but are not limited to, a hard drive, a memory card (e.g., a secure digital (SD) card, a compact flash memory card, etc.), a universal serial bus (USB)-based memory stick or thumb drive, etc.

In an example embodiment, one or more of image sensor 206, image analyzer 218, image fuser 220, and/or image signal processor 208 may be integrated together as part of a system-on-a-chip (SoC). Accordingly, one or more of image sensor 206, image analyzer 218, image fuser 220, and/or image signal processor 208 may be situated on the same silicon substrate. In another example embodiment, one or more of image sensor 206, image analyzer 218, image fuser 220, and/or image signal processor 208 may be located on separate chips. Accordingly, one or more of image sensor 206, image analyzer 218, image fuser 220, and/or image signal processor 208 may be situated on different silicon substrates. It is further noted that one or more of one or more of image sensor 206, image analyzer 218, image fuser 220, and/or image signal processor 208 may be implemented as computer program code/instructions configured to be executed in one or more processors and stored in a computer readable storage medium.

Figure 3:
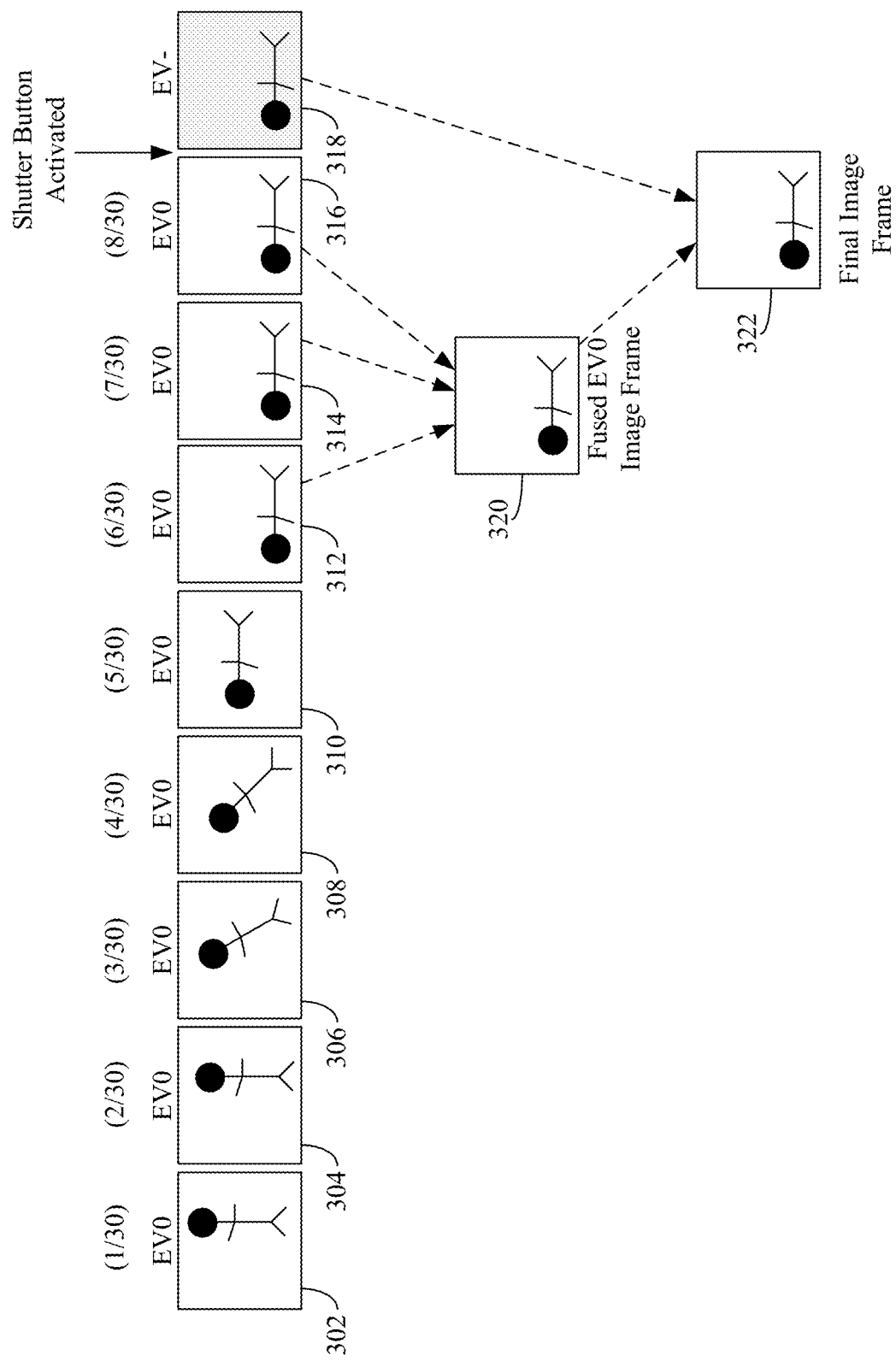
FIG. 3 depicts a diagram demonstrating the fusion of image frames in accordance with an example embodiment.

FIG. 3 depicts a diagram demonstrating the fusion of image frames in accordance with an example embodiment. As shown in FIG. 3, a user is attempting to take a picture of a moving person. The diagram includes a plurality of history images 302, 304, 306, 308, 310, 312, 314, and 316 and a highlight recovery image 318. History image frames 302, 304, 306, 308, 310, 312, 314, and 316 are examples of history image frame(s) 222 and are stored in buffer 212, as described above with reference to FIG. 2. Each of history image frames 302, 304, 306, 308, 310, 312, 314, and 316 are captured and stored in buffer 212 before the user has activated shutter button 214. Each of history image frames 302, 304, 306, 308, 310, 312, 314, and 316 are captured with an exposure value set to zero (EV0). However, it is noted that the embodiments described herein are not so limited, and that the exposure value may be set to other values. In an embodiment in which buffer 212 is configured to store 30 frames per second, each of history image frames 302, 304, 306, 308, 310, 312, 314, and 316 are stored in buffer 212 in $1/30$th of one second intervals (e.g., history image frame 302 is stored at $1/30^{th}$ of one second, history image frame 304 is stored at $2/30^{th}$ of one second, history image frame 306 is stored at $3/30^{th}$ of one second, history image frame 308 is stored at $4/30^{th}$ of one second, history image frame 310 is stored at $5/30^{th}$ of one second, history image frame 312 is stored at $6/30^{th}$ of one second, history image frame 314 is stored at $7/30^{th}$ of one second, and history image frame 316 is stored at $8/30^{th}$ of one second.

When shutter button 214 is activated, a highlight recovery frame 318 is captured. Highlight recovery frame 318 is an example of highlight recovery frame 224, as described above with reference to FIG. 2. Highlight recovery frame 318 is captured with an exposure value that is different than the exposure value used to capture history image frames 302, 304, 306, 308, 310, 312, 314, and 316. In the example shown in FIG. 3, highlight recovery frame 318 is captured with an exposure value (EV−) that causes highlight recovery frame 318 to be underexposed. Although, it is noted that the embodiments described herein are not so limited and that highlight recovery frame 318 may be captured with an exposure value that causes highlight recovery frame 318 to be overexposed. It is also noted that, in addition or in lieu of setting the exposure value so that the captured image is caused to be overexposed, highlight recovery frame 318 may be captured with the flash functionality of the camera (e.g., camera 100) being activated. It is further noted that a plurality of highlight recovery frames may be captured responsive to shutter button 214 being activated, where each of the highlight recovery frames are captured with the same or different exposure value.

After capturing highlight recovery frame 318, image analyzer 218 (as described above with reference to FIG. 2) determines which one or more images of history image frames 302, 304, 306, 308, 310, 312, 314, and 316 has a level of similarity with highlight recovery frame 318 that meets a threshold condition. In the example shown in FIG. 3, history image frames 312, 314, and 316 may be determined to have a level of similarity that meets the threshold condition with respect to highlight recovery frame 318.

After determining the image frame(s) of history image frames 302, 304, 306, 308, 310, 312, 314, and 316 that have a level of similarity that meets the threshold condition with respect to highlight recovery frame 318, image fuser 220 (as described above with reference to FIG. 2) may combine history image frames 312, 314, and 316 together to generate a fused image frame 320 having the same exposure value (EV0) as history image frames 312, 314, and 316. Image fuser 220 then combines fused image frame 320 with highlight recovery frame 318 to generate final image frame 322. Utilizing such techniques, final image frame 322 has a greater (or wider) dynamic range than any of history image frames 302, 304, 306, 308, 310, 312, 314, and 316 and highlight recovery frame 318 such that final image frame 322 has variations in light levels therewithin that cannot be obtained via capturing single image frame.

In an embodiment in which more than one highlight recovery frame is captured, image fuser 220 may first combine the captured highlight recovery frames together to generate a combined highlight recovery frame and then combine the combined highlight recovery frame with fused image frame 320 to generate final image frame 322.

Conventional techniques would simply select a predetermined reference frame from among history image frames 302, 304, 306, 308, 310, 312, 314, and 316 and combine the predetermined reference frame with highlight recovery frame 318 to generate final image frame 312. Typically, the reference frame that is selected is based on a fixed or predetermined time difference between when the highlight recovery frame is captured and when the reference image frame is captured during the preview mode. For example, with reference to FIG. 3, suppose that the reference frame is always the history image frame that is captured $6/30^{th}$ of a second (e.g., history image frame 306) from when highlight recovery frame 318. In such a scenario, there is significant movement in the scene such that the content of history image frame 306 and the content of the highlight recovery frame 318 differs significantly. The resulting final image frame 322 based on the fusion of these two frames would comprise a blurred or corrupted view of the scene being captured.

Image analyzer 218 may be configured to determine frame(s) of history image frames 302, 304, 306, 308, 310, 312, 314, and 316 having a level of similarity that meets a threshold condition with respect to highlight recovery frame 318 using various techniques. For example, in an embodiment, after shutter button 214 is activated, image analyzer 218 may be configured to compare each of history image frames 302, 304, 306, 308, 310, 312, 314, and 316 to highlight recovery frame 318 to determine a level of similarity therebetween. Image analyzer 218 designates each image frame of history image frames 302, 304, 306, 308, 310, 312, 314, and 316 that has the level of similarity with highlight recovery frame 318 as a candidate image frame. For example, with reference to FIG. 3, history image frames 312, 314, and 316 are designated as candidate image frames. Image fuser 220 then combines each of the candidate image frames (e.g., history image frames 312, 314, and 316) together to generate fused image frame 320 and combines fused image frame 320 with highlight recovery frame 318 to generate final image frame 322, as described above.

Figure 4A:
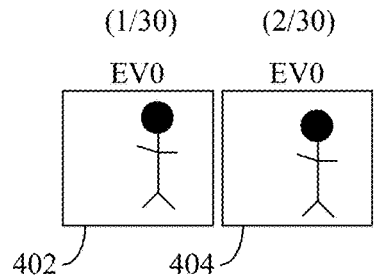
FIGS. 4A-4F depict diagrams demonstrating the fusion of image frames in accordance with another example embodiment.

In accordance with another embodiment, before shutter button 214 is activated and during the preview mode of the camera, image analyzer 218 continuously determines a level of similarity between history image frames captured in buffer 212 (e.g., history image frames 302, 304, 306, 308, 310, 312, 314, and 316) as they are stored in buffer 212. For example, FIGS. 4A-4F, depict diagrams demonstrating such a technique in accordance with an example embodiment. As shown in FIG. 4A, image analyzer 218 may be configured to, while the camera is in the preview mode, continuously compare the latest history image frame (history image frame 404) stored in buffer 212 to the history image frame stored previously to the latest image frame (e.g., history image frame 402) to determine whether there is a level of similarity therebetween that meets a threshold condition.

Figure 4B:
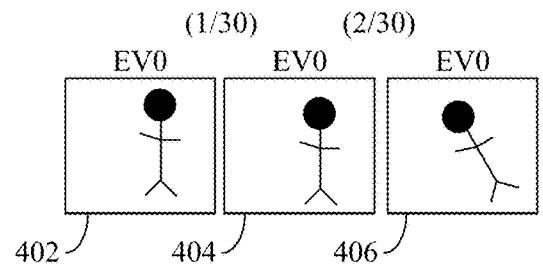

If image analyzer 218 determines that the level of similarity meets the threshold condition, then, as shown in FIG. 4B, image analyzer 218 then compares the next history image frame 406 stored in buffer 212 to the history image frame stored previously to history image frame 406 (e.g., history image frame 404) to determine whether there is a level of similarity therebetween that meets a threshold condition. In the example shown in FIG. 4B, the level of similarity does not meet the threshold condition. In response, image analyzer 218 may discard history image frames 402 and/404 from consideration when analyzing images frames stored in buffer 212 to a highlight recovery frame (as described below with reference to FIG. 4F). As used herein, discarding a history image frame may comprise either ignoring (or skipping) the history image frame for subsequent similarity comparisons to a highlight recovery frame or deleting the history image frame from buffer 212. For instance, image analyzer 228 may send a command to buffer 212 that causes buffer 212 to delete history image frames 402 and/or 404.

Figure 4C:
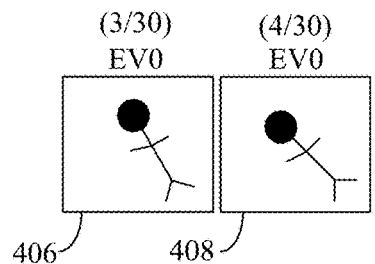

As shown in FIG. 4C, history frame images 402 and 404 are no longer stored in buffer 212. Image analyzer 218 then compares the next history image frame 408 stored in buffer 212 to the history image frame stored previously to history image frame 408 (e.g., history image frame 406) to determine whether there is a level of similarity therebetween that meets a threshold condition. In the example shown in FIG. 4C, the level of similarity does not meet the threshold condition. In response, image analyzer 218 may discard history image frame 406 from consideration when analyzing image frames stored in buffer 212 to a highlight recovery frame. For instance, image analyzer 228 may send a command to buffer 212 that causes buffer 212 to delete history image frame 406.

Figure 4D:
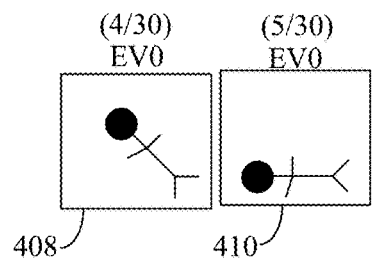

As shown in FIG. 4D, history image frame 406 is no longer stored in buffer 212. Image analyzer 218 then compares the next history image frame 410 stored in buffer 212 to the history image frame stored previously to history image frame 410 (e.g., history image frame 408) to determine whether there is a level of similarity therebetween that meets a threshold condition. In the example shown in FIG. 4D, the level of similarity does not meet the threshold condition. In response, image analyzer 218 may discard history image frame 408 from consideration when analyzing image frames stored in buffer 212 to a highlight recovery frame. For instance, image analyzer 228 may send a command to buffer 212 that causes buffer 212 to delete history image frame 408.

Figure 4E:
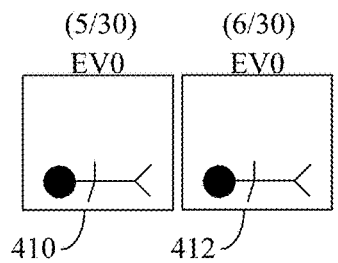

As shown in FIG. 4E, history image frame 408 is no longer stored in buffer 212. Image analyzer 218 then compares the next history image frame 412 stored in buffer 212 to the history image frame stored previously to history image frame 412 (e.g., history image frame 410) to determine whether there is a level of similarity therebetween that meets a threshold condition. In the example shown in FIG. 4E, the level of similarity meets the threshold condition, and thus, image analyzer 218 does not discard history image frame 410. In response to determining that the level of similarity meets the threshold condition, image analyzer 218 may compare the next history image frame stored in buffer 212, as shown in FIG. 4F.

Figure 4F:
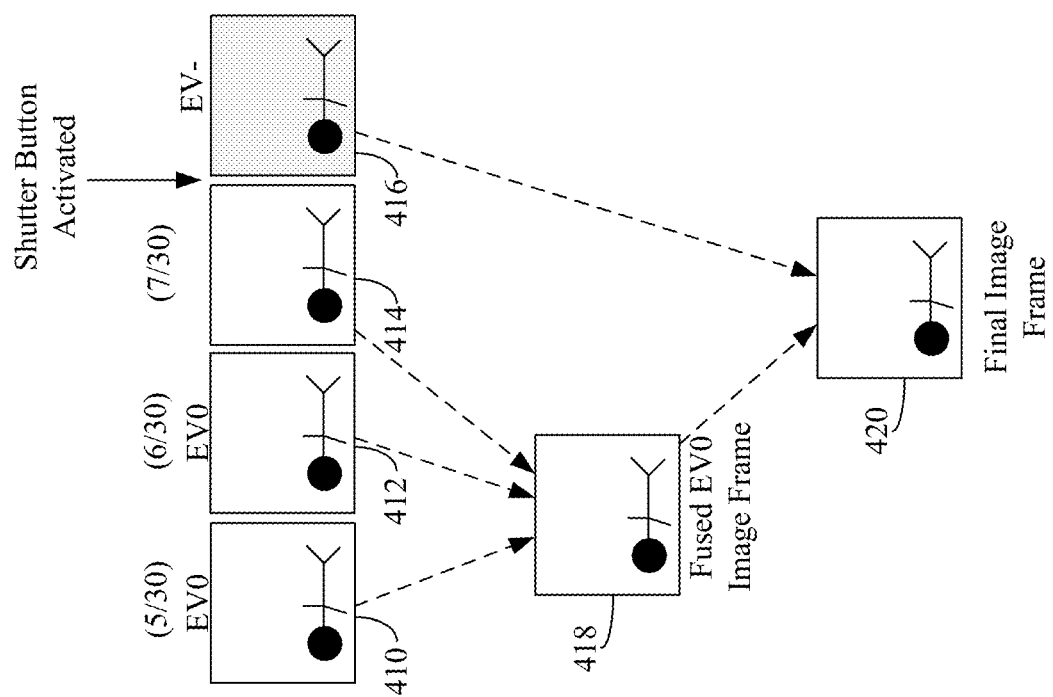

As shown in FIG. 4F, image analyzer 218 then compares the next history image frame 414 stored in buffer 212 to the history image frame stored previously to history image frame 414 (e.g., history image frame 412) to determine whether there is a level of similarity therebetween that meets a threshold condition. In the example shown in FIG. 4F, the level of similarity meets the threshold condition, and thus, image analyzer 218 does not discard history image frame 412. In response to determining that the level of similarity meets the threshold condition, image analyzer 218 may compare the next history image frame stored in buffer 212. However, in the example shown in FIG. 4F, shutter button 214 has been activated after history image frame 414 is captured. In response to shutter button 214 being activated, highlight recovery frame 416 is captured. Image analyzer 218 then compares highlight recovery frame 416 to the latest history image frame stored in buffer 212 (e.g., history image frame 414) to determine whether there is a level of similarity therebetween that meets a threshold condition. If the level of similarity meets the threshold condition, image fuser 220 then combines all of the history image frames stored in buffer 212 (e.g., history image frames 410, 412, and 414) to generate a fused image frame 418, as all of these image frames have a level of similarity therebetween that meets the threshold condition. Image fuser 220 then combines fused image frame 418 with highlight recovery frame 416 to generate final image frame 420, as described above. If the level of similarity does not meet the threshold condition, then image fuser 220 does not generate fused image frame 418 and final image frame 420. In accordance with such a continuous similarity determination technique, the number of history image frames stored in buffer 212 may be reduced. In addition, image analyzer 218 is not required to perform multiple comparisons to each of the history image frames stored in buffer 212 after shutter button 214 is activated. Instead, image analyzer 218 simply needs to compare the captured highlight recovery frame to the latest history image frame stored in buffer 212. Such a technique advantageously reduces the processing cycles required to determine whether a history image frame has a level of similarity with respect to the highlight recovery frame. Moreover, the amount of time required to generate final image frame 420 is reduced, thereby reducing the processing (or capture) latency (i.e., the delay between activating shutter button 214 and generating and displaying final image frame 420 via a display (e.g., display 216).

Figure 5:
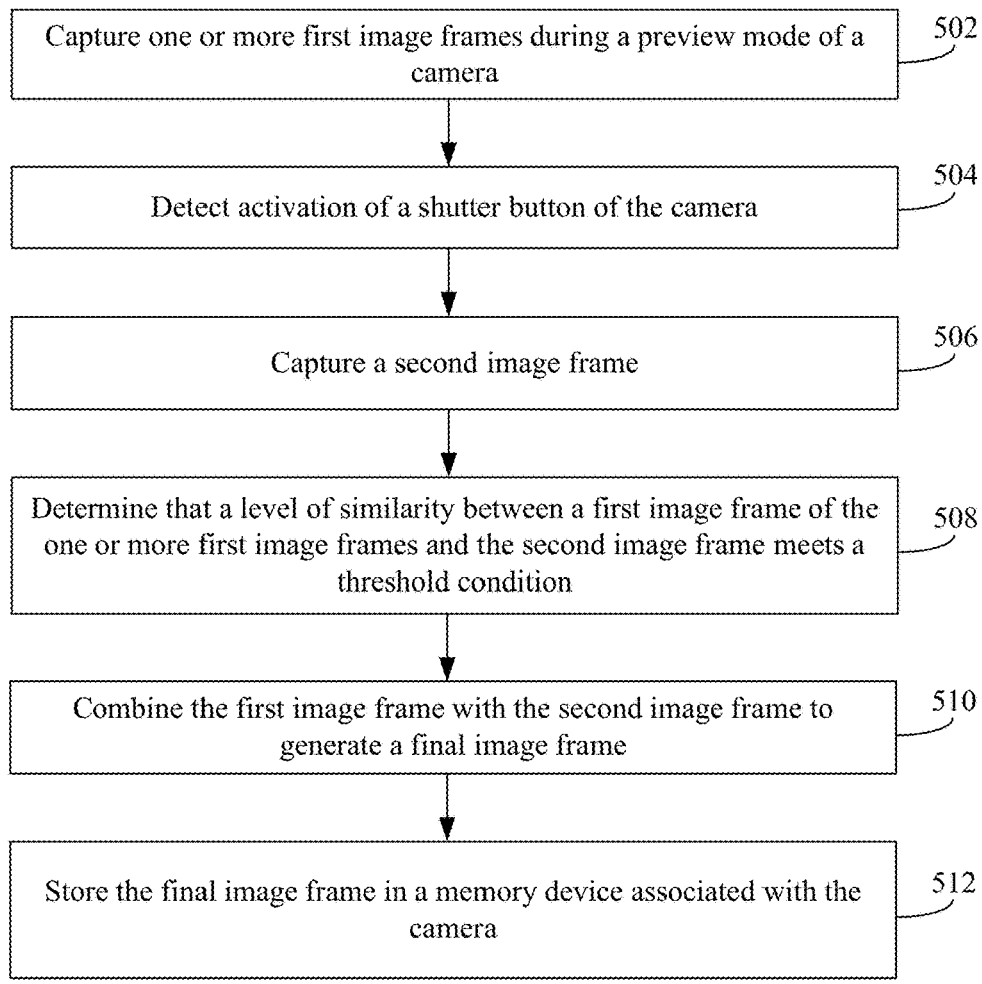
FIG. 5 shows a flowchart of a method for fusing image frames to generate an image frame having high dynamic range in accordance with an example embodiment.

Accordingly, image frames may be fused together to generate an image frame having dynamic range in many ways. For example, FIG. 5 shows a flowchart 500 of a method for fusing image frames to generate an image frame having high dynamic range in accordance with an example embodiment. In an embodiment, flowchart 500 may be implemented by system 200, as shown in FIG. 2. Accordingly, flowchart 500 will be described with continued reference to FIG. 2. Other structural and operational embodiments will be apparent to persons skilled in the relevant art(s) based on the discussion regarding flowchart 500 and system 200 of FIG. 2.

Flowchart 500 begins with step 502. In step 502, one or more first image frames are captured during a preview mode of a camera. For example, with reference to FIG. 2, image sensor 206 captures one or more history image frames 222 during a preview mode of system 200.

In accordance with one or more embodiments, the camera is included in a mobile computing device. For example, with reference to FIG. 2, system 200 is included in a mobile computing device. An example of a mobile computing device is described below with reference to FIG. 8.

In accordance with one or more embodiments, the camera is included in a mobile computing device. For example, with reference to FIG. 2, system 200 is a dedicated camera device such as, but not limited to an SLR camera, a point and shoot camera, etc.

In step 504, activation of a shutter button of the camera is detected. For example, with reference to FIG. 2, image signal processor 208 detects activation of shutter button 214.

In step 506, responsive to detecting activation of the shutter button, a second image frame is captured. For example, with reference to FIG. 2, responsive to detecting activation of shutter button 214, image signal processor 208 receives an image frame captured by image sensor 206, processes the image frame and generates highlight recovery frame 224.

In accordance with one or more embodiments, the second image frame is captured with a first exposure value of the camera that causes the second image frame to be either underexposed or overexposed based on an amount of light measured by an image sensor of the camera. For example, with reference to FIG. 2, highlight recovery frame 224 is captured with a first exposure value of system 200 that cause highlight recovery frame 224 to be underexposed or overexposed based on an amount of light measured by image sensor 206. The contrast of a given scene that is visible to a human observer cannot be captured in a single photograph due to the limited dynamic range of sensors (e.g., image sensor 206) found in a camera. By capturing and combining image frames with different light exposures (as described herein), the dynamic range of luminosity that is attained via the human eye can be emulated via the resulting final image frame.

In accordance with one or more embodiments, the one or more first image frames are captured with a second exposure value that is different than the first exposure value. For example, with reference to FIG. 2, history image frame(s) 222 are captured with a second exposure value that is different that the first exposure value. For example, history image frame(s) 222 may be captured with an exposure value set to zero.

In step 508, a determination is made that a level of similarity between a first image frame of the one or more first image frames and the second image frame meets a threshold condition. For example, with reference to FIG. 2, image analyzer 218 determines that a level of similarity between a history image frame of history image frame(s) 222 and highlight recovery frame 224 meets a threshold condition (e.g., these image frames are 95% similar). It is noted that other threshold conditions may be utilized.

In step 510, responsive to the determination that the level of similarity between the first image of the one or more first image frames and the second image frame meets the threshold condition, the first image frame is combined with the second image frame to generate a final image frame. For example, responsive to determining that the level of similarity between a history image frame of history image frame(s) 222 and highlight recovery frame 224 meet the threshold condition, the history image frame is combined with highlight recovery frame 224 to generate final image frame 226.

In step 512, the final image frame is stored in a memory device coupled to the camera. For example, with reference to FIG. 2, image fusion engine 202 stores final image frame 226 in memory 210.

In accordance with one or more embodiments, the one or more first image frames are stored in a ring buffer. For example, with reference to FIG. 2, history image frame(s) 222 are stored in buffer 212, which may be a ring buffer.

Figure 6:
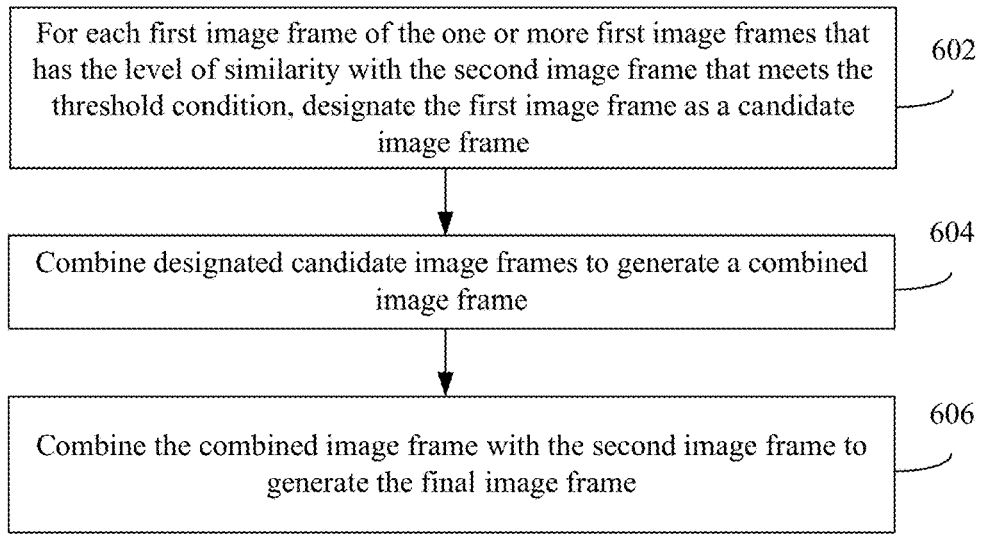
FIG. 6 shows a flowchart of a method for determining a level of similarity between image frames in accordance with an example embodiment.

Various techniques may be utilized to determine whether a first image frame of the first image frame(s) has a level of similarity with the second image frame. For example, FIG. 6 shows a flowchart 600 of a method for determining a level of similarity between a first image frame and a second image frame in accordance with an example embodiment. In an embodiment, flowchart 600 may be implemented by system 200, as shown in FIG. 2. Accordingly, flowchart 600 will be described with continued reference to FIG. 2, and also with continued reference to FIG. 3. Other structural and operational embodiments will be apparent to persons skilled in the relevant art(s) based on the discussion regarding flowchart 600 and system 200 of FIG. 2.

Flowchart 600 begins with step 602. In step 602, for each first image frame of the one or more first image frames that has the level of similarity with the second image frame that meets the threshold condition, the first image frame is designated as a candidate image frame. For example, with reference to FIG. 2, for each of history image frame of history image frame(s) 222 that has the level of similarity with highlight recovery frame 224 that meets the threshold condition, image analyzer 218 designates such history image frame(s) 222 as a candidate image frame. For instance, with reference to FIG. 3, image analyzer 218 compares each of history image frames 302, 304, 306, 308, 310, 312, 314, and 316 to highlight recovery frame 318 to determine a level of similarity therebetween. The history image frame(s) determined to have a level of similarity with highlight recovery frame 318 that meets a threshold condition are designated as candidate image frames. In the example shown in FIG. 3, history image frames 312, 314, and 316 are designated as candidate image frames.

In step 604, designated candidate image frames are combined to generate a combined image frame. For example, with reference to FIGS. 2 and 3, image fuser 220 combines candidate image frames 312, 314, and 316 to generate fused image frame 320. Combining a plurality of identified candidate image frames that have a level of similarity that meets a threshold condition with respect to each other advantageously results in a noise-reduced history image frame (i.e., an image in which noise that is present in the candidate image frames is reduced). Accordingly, combining the noise-reduced history image frame with the highlight recovery frame will result in a final image frame that has less noise than combining a single candidate image frame with the highlight recovery frame.

In step 606, the combined image frame is combined with the second image frame to generate the final image frame. For example, with reference to FIGS. 2 and 3, image fuser 220 combines fused image frame 320 with highlight recovery frame 318 to generate final image frame 322.

Figure 7:
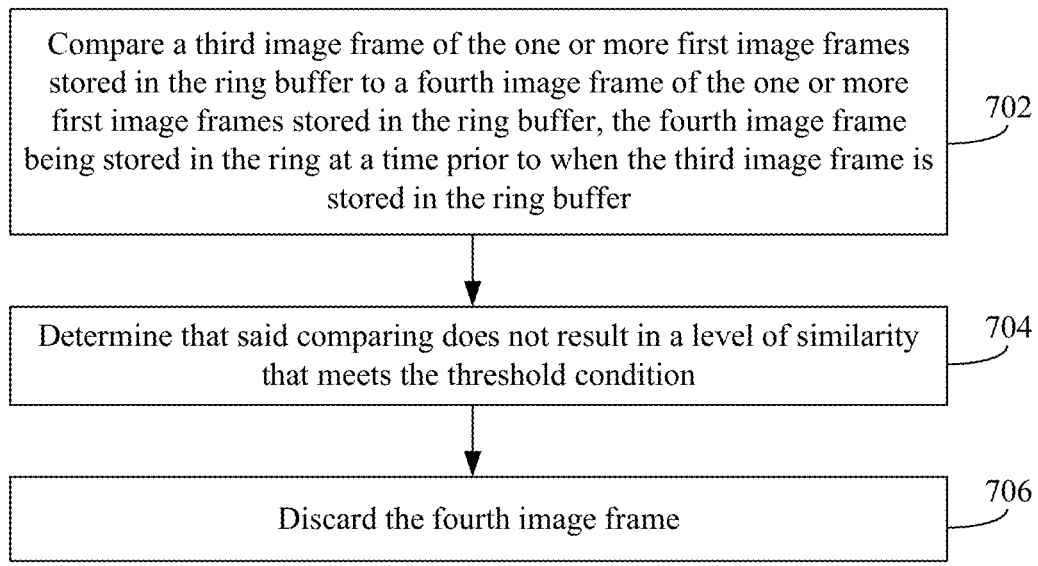
FIG. 7 shows a flowchart of a method for determining a level of similarity between image frames in accordance with another example embodiment.

FIG. 7 shows a flowchart 700 of a method for determining a level of similarity between a first image frame and a second image frame in accordance with another example embodiment. In an embodiment, flowchart 700 may be implemented by system 200, as shown in FIG. 2. Accordingly, flowchart 700 will be described with continued reference to FIG. 2, and also with continued reference to FIGS. 4A-4F. Other structural and operational embodiments will be apparent to persons skilled in the relevant art(s) based on the discussion regarding flowchart 700 and system 200 of FIG. 2. Steps 702 through 706 are performed during the preview mode of the camera.

Flowchart 700 begins with step 702. In step 702, a third image frame of the one or more first image frames stored in the ring buffer are compared to a fourth image frame of the one or more first image frames that are stored in the ring buffer, the fourth image frame being stored in the ring buffer at a time prior to when the third image frame is stored in the ring buffer. For example, with reference to FIG. 2, image analyzer 218 compares a third image frame of history image frame(s) 222 to a fourth image frame of history image frame(s) 222 that is stored in buffer 212 before the third image frame is stored in buffer 212. For example, with reference to FIG. 4B, image analyzer 218 compares history image frame 404 to history image frame 402, which was stored in buffer 212 before history image frame 404. In another example and with reference to FIG. 4C, image analyzer 218 compares history image frame 406 to history image frame 404, which was stored in buffer 212 before history image frame 404.

In step 704, a determination is made that the comparison does not result in a level of similarity that meets the threshold condition. For example, with reference to FIG. 2, image analyzer 218 determines that the comparison does not result in a level of similarity that meets the threshold condition. For instance, with reference to FIG. 4B, image analyzer 218 may determine that a comparison between history image frame 406 and history image frame 404 does not result in a level of similarity that meets the threshold condition. In another example and with reference to FIG. 4C, image analyzer 218 may determine that a comparison between history image frame 408 and history image frame 406 does not result in a level of similarity that meets the threshold condition. In a further example and with reference to FIG. 4D, image analyzer 218 may determine that a comparison between history image frame 410 and history image frame 408 does not result in a level of similarity that meets the threshold condition.

In step 706, responsive to the determination that the comparison does not result in a level of similarity that meets the threshold condition, the fourth image frame is discarded. For example, with reference to FIG. 2, image analyzer 218 may provide a command 228 to buffer 212 that causes the fourth image frame to be deleted therefrom. For instance, with reference to FIGS. 4B and 4C, command 228 may cause history image frames 402 and 404 to be deleted from buffer 212. In another example, and with reference to FIGS. 4C and 4D, command 228 may cause history image frame 406 to be deleted from buffer 212. In a further example, and with reference to FIGS. 4D and 4E, command 228 may cause history image frame 408 to be deleted from buffer 212. Alternatively, instead of deleting a history image frame from buffer 212, the history image frame may be ignored (or skipped) when performing similarity comparisons to a highlight recovery frame.

In accordance with one or more embodiments, responsive to detecting activation of the shutter button and after the second image frame (e.g., the highlight recovery frame) is generated, the second image frame is compared image frame(s) (e.g., the third image frame) stored in buffer 212. Image analyzer 218 then determines whether the second image frame and the third image frame (and/or any other history image frame stored in buffer 212 post-shutter button 214 activation, as they are all relatively similar to each other) have the level of similarity that meets the threshold condition based on the comparison. For example, with reference to FIGS. 2 and 4F, image analyzer 218 compares highlight recovery frame 416 with history image frame 414 (or one of history image frame 410 or history image frame 412) to determine whether there is a level of similarity therebetween that meets a threshold condition.

In response to determining that the second image frame and the third image frame have the level of similarity that meets the threshold condition, then the second image frame and the third image frame are combined to generate the final image frame. In the example show in FIG. 4F, because there is more than one history image frame stored in buffer 212, image fuser 220 first combines history image frames 410, 412, and 414 to generate fused image frame 418 and then combines fused image frame 418 with highlight recovery frame 416 to generate final image frame 420. As described above, in accordance with such a continuous similarity determination technique, the number of history image frames stored in buffer 212 may be reduced. In addition, image analyzer 218 is not required to perform multiple comparisons to each of the history image frames stored in buffer 212 after shutter button 214 is activated. Instead, image analyzer 218 simply needs to compare the captured highlight recovery frame to the latest history image frame stored in buffer 212. Such a technique advantageously reduces the processing cycles required to determine whether a history image frame has a level of similarity with respect to the highlight recovery frame. Moreover, the amount of time required to generate the final image frame (e.g., final image frame 420) is reduced, thereby reducing the processing (or capture) latency (i.e., the delay between activating shutter button 214 and generating and displaying the final image frame via a display (e.g., display 216).

III. Example Mobile Device and Computing Device Embodiments

Each of camera 100, image fusion engine 102, system 200, image fusion engine 202, lens(es) 204, image sensor 206, image signal processor 208, memory 210, buffer 212, shutter button 214, and/or display 216 (and/or any of the components thereof) and/or of the steps of flowcharts 500, 600, and/or 700 may be implemented in hardware, or hardware combined with software and/or firmware. For example, image fusion engine 102, image fusion engine 202, image signal processor 208, buffer 212, and/or shutter button 214, and/or (and/or any of the components thereof) and/or of the steps of flowcharts 500, 600, and/or 700 may be implemented as computer program code/instructions configured to be executed in one or more processors and stored in a computer readable storage medium. Alternatively, each of camera 100, image fusion engine 102, system 200, image fusion engine 202, lens(es) 204, image sensor 206, image signal processor 208, memory 210, buffer 212, shutter button 214, and/or display 216 (and/or any of the components thereof) and/or of the steps of flowcharts 500, 600, and/or 700 may be implemented as hardware logic/electrical circuitry.

As noted herein, the embodiments described, including camera 100, image fusion engine 102, system 200, image fusion engine 202, lens(es) 204, image sensor 206, image signal processor 208, memory 210, buffer 212, shutter button 214, and/or display 216 (and/or any of the components thereof) and/or of the steps of flowcharts 500, 600, and/or 700, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 8:
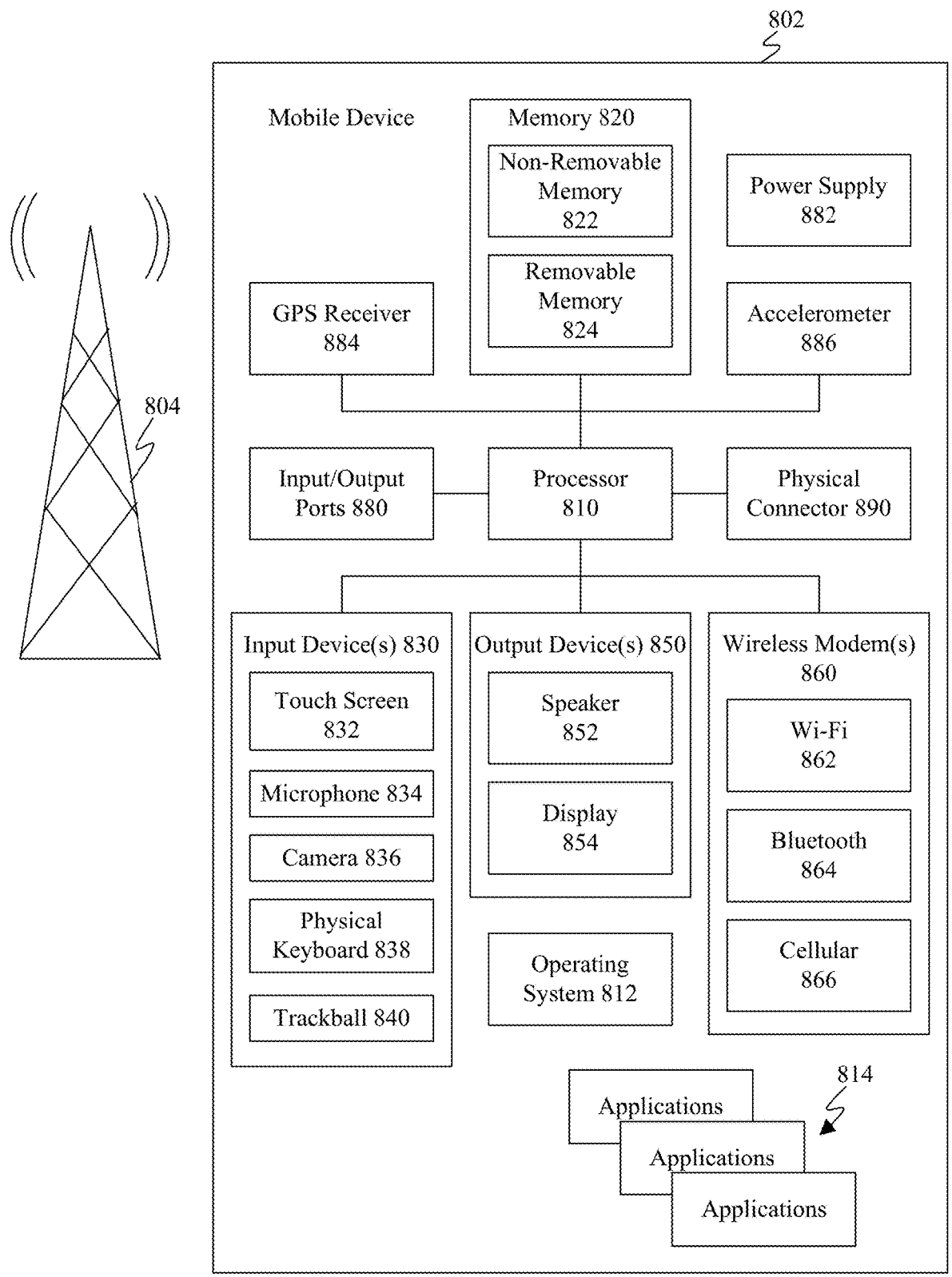
FIG. 8 shows a block diagram of an example mobile device that may be used to implement various embodiments.

FIG. 8 is a block diagram of an exemplary mobile system 800 that includes a mobile device 802 that may implement embodiments described herein. For example, mobile device 802 may be used to implement any system, client, or device, or components/subcomponents thereof, in the preceding sections. As shown in FIG. 8, mobile device 802 includes a variety of optional hardware and software components. Any component in mobile device 802 can communicate with any other component, although not all connections are shown for ease of illustration. Mobile device 802 can be any of a variety of computing devices (e.g., cell phone, smart phone, handheld computer, Personal Digital Assistant (PDA), etc.) and can allow wireless two-way communications with one or more mobile communications networks 804, such as a cellular or satellite network, or with a local area or wide area network.

Mobile device 802 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components of mobile device 802 and provide support for one or more application programs 814 (also referred to as "applications" or "apps"). Application programs 814 may include common mobile computing applications (e.g., e-mail applications, calendars, contact managers, web browsers, messaging applications) and any other computing applications (e.g., word processing applications, mapping applications, media player applications).

Mobile device 802 can include memory 820. Memory 820 can include non-removable memory 822 and/or removable memory 824. Non-removable memory 822 can include RAM, ROM, flash memory, a hard disk, or other well-known memory devices or technologies. Removable memory 824 can include flash memory or a Subscriber Identity Module (SIM) card, which is well known in GSM communication systems, or other well-known memory devices or technologies, such as "smart cards." Memory 820 can be used for storing data and/or code for running operating system 812 and application programs 814. Example data can include web pages, text, images, sound files, video data, or other data to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 820. These programs include operating system 812, one or more application programs 814, and other program modules and program data. Examples of such application programs or program modules may include, for example, computer program logic (e.g., computer program code or instructions) for implementing one or more of image fusion 102 of FIG. 1, image fusion engine 202, image analyzer 218 and/or image fuser 220 of FIG. 2, along with any components and/or subcomponents thereof, as well as the flowcharts/flow diagrams (e.g., flowcharts 500, 600, and/or 700) described herein, including portions thereof, and/or further examples described herein.

Mobile device 802 can support one or more input devices 830, such as a touch screen 832, a microphone 834, a camera 836, a physical keyboard 838 and/or a trackball 840 and one or more output devices 850, such as a speaker 852 and a display 854. Other possible output devices (not shown) can include piezoelectric or other haptic output devices. Some devices can serve more than one input/output function. For example, touch screen 832 and display 854 can be combined in a single input/output device. Input devices 830 can include a Natural User Interface (NUI).

One or more wireless modems 860 can be coupled to antenna(s) (not shown) and can support two-way communications between processor 810 and external devices, as is well understood in the art. Modem 860 is shown generically and can include a cellular modem 866 for communicating with the mobile communication network 804 and/or other radio-based modems (e.g., Bluetooth 864 and/or Wi-Fi 862). At least one wireless modem 860 is typically configured for communication with one or more cellular networks, such as a GSM network for data and voice communications within a single cellular network, between cellular networks, or between the mobile device and a public switched telephone network (PSTN).

Mobile device 802 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components of mobile device 802 are not required or all-inclusive, as any components can be deleted and other components can be added as would be recognized by one skilled in the art.

In an embodiment, mobile device 802 is configured to implement any of the above-described features of flowcharts herein. Computer program logic for performing any of the operations, steps, and/or functions described herein may be stored in memory 820 and executed by processor 810.

Figure 9:
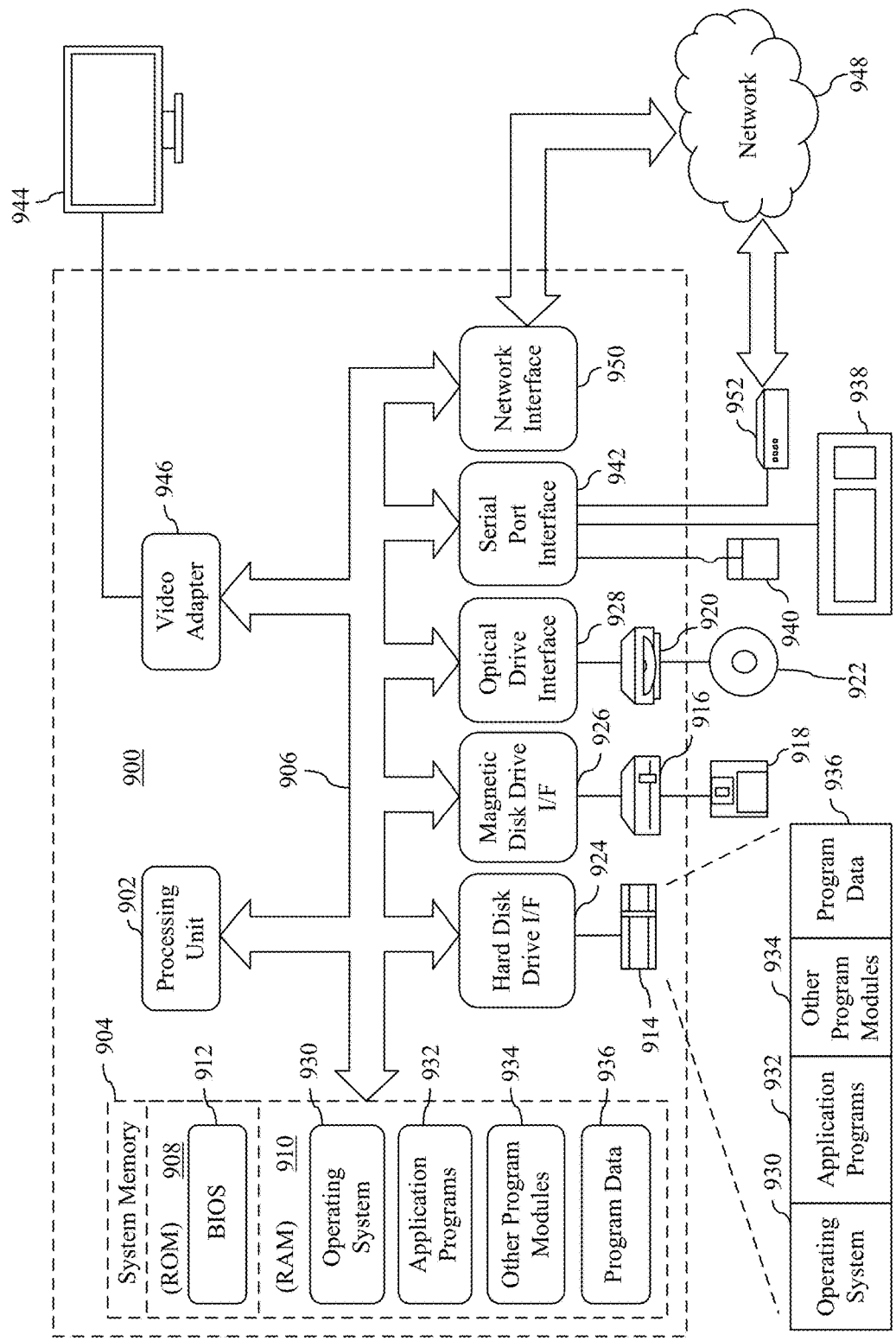
FIG. 9 shows a block diagram of an example computer system in which embodiments may be implemented.

FIG. 9 depicts an exemplary implementation of a computing device 900 in which embodiments may be implemented. For example, each of camera 100, image fusion engine 102, system 200, image fusion engine 202, lens(es) 204, image sensor 206, image signal processor 208, memory 210, buffer 212, shutter button 214, and/or display 216 (and/or any of the components thereof) and/or of the steps of flowcharts 500, 600, and/or 700 may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems and/or game consoles, etc., as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for each of, along with any components and/or subcomponents thereof, as well as the flowcharts/flow diagrams described herein, including portions thereof, and/or further examples described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Further Example Embodiments

A system is described herein. The system includes: a memory; an image sensor configured to capture one or more first image frames during a preview mode of a camera; at least one processor circuit configured to: detect activation of a shutter button of the camera; and responsive to detecting activation of the shutter button, capture a second image frame; and an image fusion engine configured to: determine that a level of similarity between a first image frame of the one or more first image frames and the second image frame meets a threshold condition; responsive to a determination that the level of similarity between the first image frame of the one or more first image frames and the second image frame meets the threshold condition, combine the first image frame with the second image frame to generate a final image frame; and store the final image frame in the memory.

In one implementation of the foregoing system, the system is included in a mobile computing device.

In one implementation of the foregoing system, the system is included in a dedicated camera device.

In one implementation of the foregoing system, the one or more first image frames are stored in a ring buffer of the system.

In one implementation of the foregoing system, the image fusion engine is further configured to: during the preview mode of the camera: compare a third image frame of the one or more first image frames stored in the ring buffer to a fourth image frame of the one or more first image frames stored in the ring buffer, the fourth image frame being stored in the ring buffer at a time prior to when the third image frame is stored in the ring buffer; determine that said comparing does not result in a level of similarity that meets the threshold condition; and responsive to a determination that said comparing does not result in a level of similarity that meets the threshold condition, discard the fourth image frame.

In one implementation of the foregoing system, the third image frame is the first image frame.

In one implementation of the foregoing system, the image fusion engine is configured to determine that the level of similarity between a first image frame of the one or more first image frames and the second image frame meets the threshold condition by: for each first image frame of the one or more first image frames that has the level of similarity with the second image frame that meets the threshold condition, designating the first image frame as a candidate image frame; combining designated candidate image frames to generate a combined image frame; and combining the combined image frame with the second image frame to generate the final image frame.

In one implementation of the foregoing system, the at least one processor circuit is configured to capture the second image frame with a first exposure value of the camera that causes the second image frame to be either underexposed or overexposed based on an amount of light measured by the image sensor.

In one implementation of the foregoing system, the image sensor is configured to capture the one or more first image frames with a second exposure value that is different than the first exposure value.

A method is also described herein. The method includes: capturing one or more first image frames during a preview mode of a camera; detecting activation of a shutter button of the camera; responsive to detecting activation of the shutter button, capturing a second image frame; determining that a level of similarity between a first image frame of the one or more first image frames and the second image frame meets a threshold condition; responsive to said determining, combining the first image frame with the second image frame to generate a final image frame; and storing the final image frame in a memory device associated with the camera.

In one implementation of the foregoing method, the camera is included in a mobile computing device.

In one implementation of the foregoing method, the camera a dedicated camera device.

In one implementation of the foregoing method, the one or more first image frames are stored in a ring buffer.

In one implementation of the foregoing method, the method further comprises: during the preview mode of the camera: comparing a third image frame of the one or more first image frames stored in the ring buffer to a fourth image frame of the one or more first image frames stored in the ring buffer, the fourth image frame being stored in the ring buffer at a time prior to when the third image frame is stored in the ring buffer; determining that said comparing does not result in a level of similarity that meets the threshold condition; and responsive to determining that said comparing does not result in a level of similarity that meets the threshold condition, discarding the fourth image frame.

In one implementation of the foregoing method, the third image frame is the first image frame.

In one implementation of the foregoing method, determining that the level of similarity between a first image frame of the one or more first image frames and the second image frame meets the threshold condition comprises: for each first image frame of the one or more first image frames that has the level of similarity with the second image frame that meets the threshold condition, designating the first image frame as a candidate image frame; combining designated candidate image frames to generate a combined image frame; and combining the combined image frame with the second image frame to generate the final image frame.

In one implementation of the foregoing method, capturing the second image frame comprises: capturing the second image frame with a first exposure value of the camera that causes the second image frame to be either underexposed or overexposed based on an amount of light measured by an image sensor of the camera.

In one implementation of the foregoing method, capturing the one or more first image frames comprises: capturing the one or more first image frames with a second exposure value that is different than the first exposure value.

A computer-readable storage medium having program instructions recorded thereon that, when executed by at least one processor, perform a method. The method includes: capturing one or more first image frames during a preview mode of a camera; detecting activation of a shutter button of the camera; responsive to detecting activation of the shutter button, capturing a second image frame; determining that a level of similarity between a first image frame of the one or more first image frames and the second image frame meets a threshold condition; responsive to said determining, combining the first image frame with the second image frame to generate a final image frame; and storing the final image frame in a memory device associated with the camera.

In one implementation of the foregoing computer-readable storage medium, the camera is included in a mobile computing device.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A device that includes a camera, the device comprising:
   a processor; and
   a memory that stores program code structured to cause the processor to:
      capture a first history image frame by the camera prior to activation of a user interface element configured to cause an image frame to be captured by the camera;
      subsequent to capture of the first history image frame, receive the activation of the user interface element;
      capture a subsequent image frame in response to the received activation;
      determine a level of similarity between the first history image frame captured by the camera and the subsequent image frame captured by the camera;
      responsive to a determination that the level of similarity meets a threshold condition, combine the subsequent image frame at least with the first history image frame to generate a final image frame; and
      store the final image frame in the memory.

2. The device of claim 1, wherein, to combine the subsequent image frame at least with the first history image frame, the program code is further structured to cause the processor to:
combine the subsequent image frame at least with the first history image frame and at least one further history image frame to generate the final image frame.

3. The device of claim 2, wherein, to combine the subsequent image frame at least with the first history image frame and at least one further history image frame, the program code is further structured to cause the processor to:
determine a level of similarity between the first history image frame and a second history image frame;
responsive to a determination that the level of similarity between the first history image frame and the second history image frame meets the threshold condition, combine the first and second history image frames to generate a combined image frame; and
combine the subsequent image frame with the combined image frame to generate the final image frame.

4. The device of claim 3, wherein the first and second history image frames are combined to generate the combined image frame prior to the subsequent image frame being captured.

5. The device of claim 1, wherein the history image frame is captured with a first exposure value that is different from a second exposure value used to capture the subsequent image frame.

6. The device of claim 1, wherein the program code is further structured to cause the processor to:
capture a plurality of history image frames by the camera prior to the received activation, the capture of the plurality of history images frames includes the capture of the first history image frame; and
subsequent to receipt of the activation of the user interface element, determine a level of similarity to the subsequent image frame for each of the plurality of history image frames;
wherein said combine the subsequent image frame at least with the first history image frame to generate a final image frame comprises:
combine the subsequent image frame with each history image frame of the plurality of history image frames meeting the threshold condition to generate the final image frame.

7. The device of claim 6, wherein the program code is further structured to cause the processor to:
store each history image frame of the plurality of history image frames in a corresponding element of a ring buffer having a number N of elements; and
store the subsequent image frame in a first element of the ring buffer in place of an oldest image frame of the history image frames.

8. A method in a device that includes a camera, the method comprising:
capturing a first history image frame by the camera prior to activation of a user interface element configured to cause an image frame to be captured by the camera;
subsequent to said capturing of the first history image frame, receiving the activation of the user interface element;
capturing a subsequent image frame in response to the received activation;
determining a level of similarity between the first history image frame captured by the camera and the subsequent image frame captured by the camera;
responsive to a determination that the level of similarity meets a threshold condition, combining the subsequent image frame at least with the first history image frame to generate a final image frame; and
storing the final image frame in the memory.

9. The method of claim 8, wherein said combining comprises:
combining the subsequent image frame at least with the first history image frame and at least one further history image frame to generate the final image frame.

10. The method of claim 9, wherein said combining the subsequent image frame at least with the first history image frame and at least one further history image frame to generate the final image frame comprises:
determining a level of similarity between the first history image frame and a second history image frame;
responsive to a determination that the level of similarity between the first history image frame and the second history image frame meets the threshold condition, combining the first and second history image frames to generate a combined image frame; and
combining the subsequent image frame with the combined image frame to generate the final image frame.

11. The method of claim 10, wherein said combining the first and second history image frames to generate a combined image frame is performed prior to the subsequent image frame being captured.

12. The method of claim 8, wherein the history image frame is captured with a first exposure value that is different from a second exposure value used to capture the subsequent image frame.

13. The method of claim 8, further comprising:
capturing a plurality of history image frames by the camera prior to the received activation, said capturing of the plurality of history images frames comprising said capturing of the first history image frame; and
subsequent said receiving the activation of the user interface element, determining a level of similarity to the subsequent image frame for each of the plurality of history image frames;
wherein said combining the subsequent image frame at least with the first history image frame to generate a final image frame comprises:
combining the subsequent image frame with each history image frame of the plurality of history image frames meeting the threshold condition to generate the final image frame.

14. The method of claim 13, further comprising:
storing each history image frame of the plurality of history image frames in a corresponding element of a ring buffer having a number N of elements; and
storing the subsequent image frame in a first element of the ring buffer in place of an oldest image frame of the history image frames.

15. A computer-readable storage medium having program instructions recorded thereon that, when executed by at least one processor, perform a method comprising:
capturing a first history image frame by a camera prior to activation of a user interface element configured to cause an image frame to be captured by the camera;
subsequent to said capturing of the first history image frame, receiving the activation of the user interface element;
capturing a subsequent image frame in response to the received activation;

determining a level of similarity between the first history image frame captured by the camera of a device and the subsequent image frame captured by the camera;

responsive to a determination that the level of similarity meets a threshold condition, combining the subsequent image frame at least with the first history image frame to generate a final image frame; and storing the final image frame in the memory.

16. The computer-readable storage medium of claim 15, wherein said combining comprises:

combining the subsequent image frame at least with the first history image frame and at least one further history image frame to generate the final image frame.

17. The computer-readable storage medium of claim 16, wherein said combining the subsequent image frame at least with the first history image frame and at least one further history image frame to generate the final image frame comprises:

determining a level of similarity between the first history image frame and a second history image frame;

responsive to a determination that the level of similarity between the first history image frame and the second history image frame meets the threshold condition, combining the first and second history image frames to generate a combined image frame; and combining the subsequent image frame with the combined image frame to generate the final image frame.

18. The computer-readable storage medium of claim 17, wherein said combining the first and second history image frames to generate a combined image frame is performed prior to the subsequent image frame being captured.

19. The computer-readable storage medium of claim 15, wherein the history image frame is captured with a first exposure value that is different from a second exposure value used to capture the subsequent image frame.

20. The computer-readable storage medium of claim 15, wherein the device is a mobile computing device or a dedicated camera device.

\* \* \* \* \*